UNITED STATES PATENT OFFICE.

JAMES F. THOMPSON, OF TUSCOLA, ILLINOIS.

PLASTERING COMPOUND.

SPECIFICATION forming part of Letters Patent No. 286,165, dated October 2, 1883.

Application filed June 19, 1883. (No specimens.)

*To all whom it may concern:*

Be it known that I, JAMES F. THOMPSON, a citizen of the United States of America, residing at Tuscola, in the county of Douglas and State of Illinois, have invented certain new and useful Improvements in Plastering, being a "plastering compound," of which the following is a specification.

My invention is directed to the production of a plaster or plastering compound which will remedy or avoid many of the defects of those now in use; a compound that when applied will be less liable to chip, crack, or disintegrate, that will be less liable to fall by a jar, when wet by a leakage of roof or otherwise, and less liable to fall by its own weight when so wet; a compound from which a clinch having been made to the lath or wall, and having time to become rigid, is almost absolutely permanent. I obtain such a plastering compound by a mixture of plaster-of-paris or ordinary cement, sawdust, hair, and water sufficient to bring it to proper consistence for applying. The plaster or cement is ready for use in its ordinary commercial condition; likewise the hair. The sawdust as it comes from the mill or yard with ordinary exposure is in condition for use, for a reasonable period of exposure does not appreciably injure it. The water may be hard or soft, warm or cold. The proportions, which, however, may be slightly varied without material deterioration, are approximately for the first or clinching coat as follows: To each one hundred yards of plastering, (100 yards,) one hundred pounds of plaster-of-paris (100 pounds) or cement, one cubic yard (1 yard) of sawdust, six pounds (6 pounds) of plastering-hair, and water sufficient to make it the proper consistence for applying. The other coats or coat may be whitened by plaster or the addition of cement or lime.

The advantages of this compound over the ordinary compound are apparent: first, the clinch is almost absolutely permanent; second, wet or dry, its weight will not cause it to fall; third, it will not crack by wind or temperature; fourth, it will not chip or scale by reason of wall slaking; fifth, the material is readily obtained, easily transported, mixed, and applied.

I am aware that the use of plaster-of-paris, cement, hair, prepared wood-pulp, and mineral powder is not new. I make no claim that it is.

What I do claim is—

A plastering compound composed of plaster-of-paris or cement, sawdust, hair, and water, as and for the purpose specified.

In testimony whereof I affix my signature in presence of two witnesses.

JAMES F. THOMPSON.

Witnesses:
JOHN N. OUTCELL,
WILLIAM R. BROWN.